United States Patent [19]

Carlson et al.

[11] 4,000,956
[45] Jan. 4, 1977

[54] IMPACT RESISTANT BLADE

[75] Inventors: Robert G. Carlson, Greenhills; Robert W. Harrison, Cincinnati, both of Ohio

[73] Assignee: General Electric Company, Cincinnati, Ohio

[22] Filed: Dec. 22, 1975

[21] Appl. No.: 643,495

[52] U.S. Cl. .................... 416/230; 416/241 A
[51] Int. Cl.² ........................................ F01D 5/28
[58] Field of Search ...... 416/229, 230, 241, 241 A, 416/224; 29/156.8 B

[56] References Cited

UNITED STATES PATENTS

| | | | |
|---|---|---|---|
| 3,602,608 | 8/1971 | Morley | 416/224 |
| 3,649,425 | 3/1972 | Alexander | 161/43 |
| 3,711,936 | 1/1973 | Athey et al. | 29/475 |
| 3,762,835 | 10/1973 | Carlson et al. | 416/224 |
| 3,841,942 | 10/1974 | Carlson et al. | 156/436 |
| 3,883,267 | 5/1975 | Baudier et al. | 416/230 |
| 3,886,647 | 6/1975 | Alexander | 228/175 |
| 3,900,150 | 8/1975 | Delgrosso et al. | 228/185 |
| 3,942,231 | 3/1976 | Whitaker | 29/156.8 B |

FOREIGN PATENTS OR APPLICATIONS 1,328,167  8/1973  United Kingdom .......... 416/241 A Primary Examiner—Everette A. Powell, Jr.
Attorney, Agent, or Firm—Robert C. Lampe, Jr.; Derek P. Lawrence

[57] ABSTRACT

A blade fabricated of a plurality of bonded filament laminates, at least one of the laminates characterized by a plurality of continuous, collimated filaments embedded in a different matrix at the blade tip than at the blade root. The matrices are characterized by different relative impact strengths.

7 Claims, 6 Drawing Figures

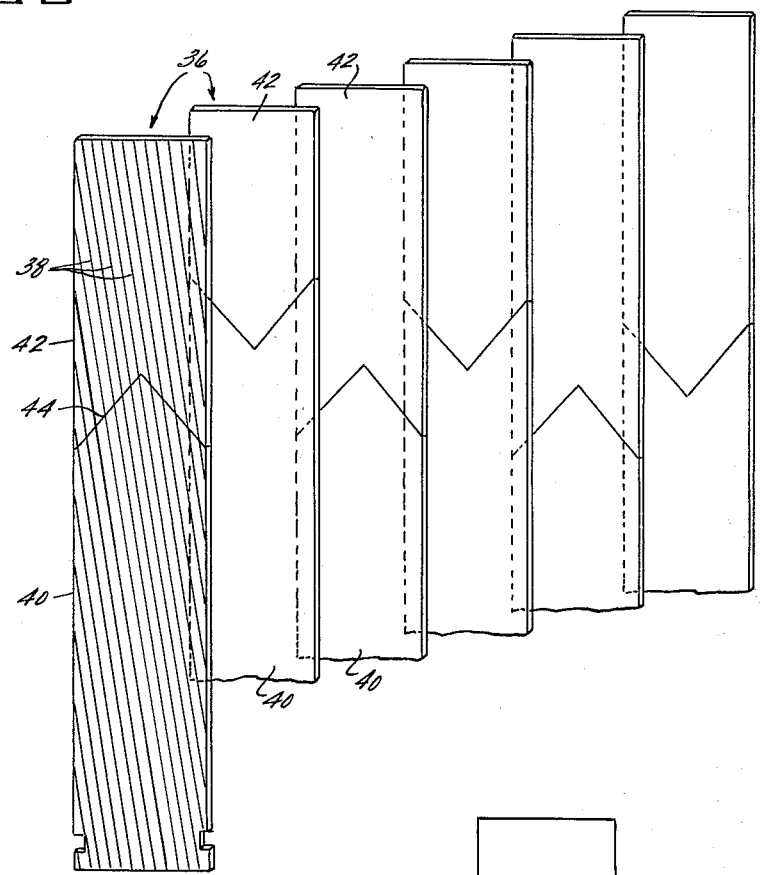
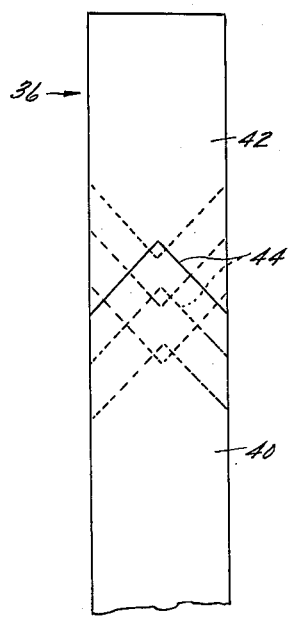

IMPACT RESISTANT BLADE

BACKGROUND OF THE INVENTION

This invention relates to composite blades for use in fluid flow machines and, more particularly, to increasing their tolerance to foreign object impact.

For many years attempts have been made to replace the relatively heavy, homogeneous metal blades and vanes of fluid flow machines such as gas turbine engine compressors with lighter composite materials. The primary effort in this direction has been toward the use of high strength, elongated filaments composited in a lightweight matrix. Early work involved glass fibers, and more recent efforts have been directed toward the utilization of boron, graphite and other synthetic filaments. These later materials have extremely high strength characteristics as well as high moduli of elasticity which contributes to the necessary stiffness of the compressor blades and vanes.

Many problems have confronted the efforts to utilize these filaments, particularly in adapting their unidirectional strength characteristics to a multidirectional stress field. To a large extent, these problems have been overcome and composite blades have been demonstrated with performance characteristics, in many areas, equal to or better than their homogeneous metal counterparts in addition to providing the expected and significant weight reductions.

However, one major obstacle to the realization of the full potential of composite materials for gas turbine engine applications has been their relatively low tolerance to impact or foreign object damage (FOD) due to foreign object ingestion. Typically, a composite blade is fabricated by bonding together a plurality of substantially parallel filament laminates. Each laminate consists of a single layer of generally elongated filaments anchored in a lightweight matrix. Where, for example, the matrix comprises aluminum and the filaments are boron, aluminum foil sheets are placed on both sides of the boron filament layer and bonded together by the known diffusion bonding or continuous-roll bonding technique.

Under certain processing conditions in composite blade manufacture, the degree of bonding can be extensive, resulting in a rigid structure incapable of tolerating high impact loadings. Since the matrix material cannot absorb much energy through deformation, and since the laminates are extensively bonded, substantially all of the load is carried by the filaments which are relatively hard and brittle. Fracture of the filaments generally results in fracture of the blade. Higher impact strength matrix materials, on the other hand, do not possess the bondability of the more ductile materials. If bonding is substantially incomplete between filament laminates, the laminates tend to slide with respect to each other under shear loadings, much in the manner of a deck of cards. When excessive sliding occurs, ability to absorb impact energy greatly decreases. Increases in bonding pressure and temperature, though effective in increasing bonding, can produce crushing of the filaments and high residual thermal stresses due to the different coefficients of expansion of the various constituents. Both of these factors contribute to reduced impact resistance and, thus, reduced tolerance to foreign object impact damage.

Thus, it becomes desirable to develop a composite blade for use in a fluid flow machine which incorporates high strength materials and improved bondability.

SUMMARY OF THE INVENTION

Accordingly, it is a primary object of the present invention to provide a composite blade having improved tolerance to foreign object impact.

It is a further object of the present invention to provide a blade, selected portions of which may be characterized by improved tolerance to foreign object impact.

It is yet another object of the present invention to provide a method of making a filament composite laminate having improved impact tolerance and for use in a composite article.

These and other objects and advantages will be more clearly understood from the following detailed description, the drawings and specific examples, all of which are intended to be typical of, rather than in any way limiting to the scope of, the present invention.

Briefly stated, the above objectives are accomplished in a blade formed of elongated, continuous filaments, having high strength and high modulus of elasticity, which are composited into a lightweight matrix. A plurality of such filament laminates are bonded together in a substantially parallel relationship to form the primary composite structure of the blade. It is desirable, in fabricating such a blade, that the impact tolerance of the blade tip be improved. According to the present invention, the continuous filaments are embedded in two different matrices characterized by different relative impact strengths, the strength of the tip matrix being generally greater than that of the hub. In the preferred embodiment, the tip matrix comprises two materials having different properties sandwiching the continuous collimated filaments wherein the material disposed toward the blade suction surface is characterized by a higher impact strength than that toward the blade pressure surface. Such a blade may be fabricated by bonding, in the known manner, the collimated filaments between two sheets of a specific metallic material to form a laminate. A portion of one sheet is then stripped off in the region to be improved and replaced with a second material characterized by an impact strength higher than that of the material originally applied. The laminate is then rebonded to unify the structure. Impact tests have revealed anisotropic behavior of a blade fabricated from such monotapes or laminates. When impacted upon the blade pressure surface, they exhibit impact strengths nearly twice those obtained if impacted upon the blade suction surface.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 5 is an exploded view of several blade laminates fabricated in accordance with the present invention; and FIG. 6 represents the superimposed laminates of FIG. 5.

DESCRIPTION OF THE PREFERRED EMBODIMENT

Figure 1:
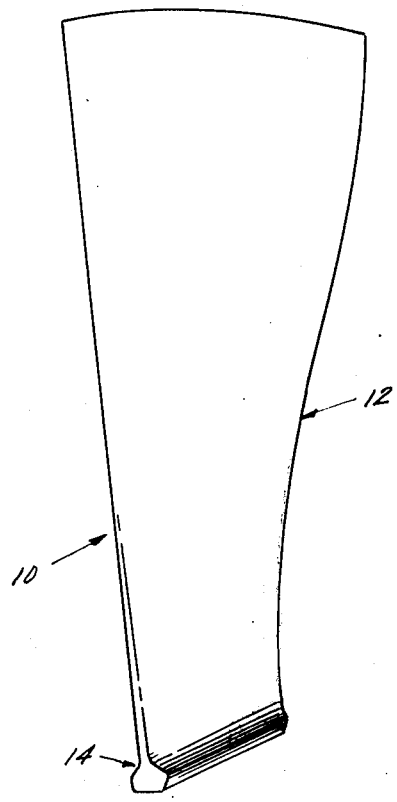
FIG. 1 is a perspective view of a composite gas turbine engine compressor blade embodying the present invention.

Referring to the drawings wherein like numerals correspond to like elements throughout, attention is first directed to FIG. 1 wherein a composite blade 10 for use in a fluid flow machine and constructed according to the present invention is illustrated. While not so limiting, the blade 10 is adapted for use in axial flow gas turbine engine compressors and fans. It will become apparent to those skilled in the art that the present invention offers an improvement for many bladed structures and that rotor blade 10 is merely meant to be illustrative of one such application. Accordingly, rotor blade 10 is shown to comprise an airfoil portion 12, generally of radially variant camber and stagger, and a dovetail tang 14 which enables the blade to be mounted on and retained by a rotatable disc or hub in a conventional manner. A typical flow path defining platform, not shown, could be mounted between the airfoil 12 and the dovetail 14 portions of the blade.

The major portion, or primary structure, of the blade comprises laminates of elongated, continuous filaments having high strength and high modulus of elasticity embedded in a lightweight matrix. The filament laminates are laid and bonded together in essentially parallel relationship to each other to form the airfoil portion 12 of blade 10. In the preferred embodiment involving predominantly metallic material, the blade would comprise bonded boron filament laminates in an aluminum matrix. It is anticipated, however, that the structure could comprise any nonmetallic system, including graphite filaments and an epoxy resin. Further, it is understood that the present invention anticipates the use of any fiber embedded in any binder, such as an organic resin, for its structure.

Figure 2:
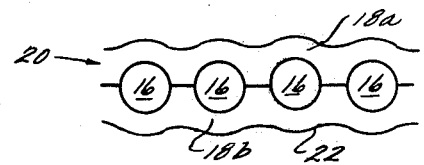
FIG. 2 is a cross-sectional view of a single composite laminate.

Focusing now upon a single filament composite ply or laminate, attention is directed to the cross-sectional view of FIG. 2. Therein, a single layer of collimated, elongated boron filaments 16 is sandwiched between two layers of aluminum foil 18a, 18b of preferred metals/alloys to be discussed later. These constituents have been diffusion bonded in the known manner to form the unitized ply 20 as depicted. It is to be recognized that while a boron/aluminum composite system is discussed for sake of example, it will become clear that the present invention is not so limiting.

It has been determined that the toughness of a blade or other article under impact, i.e., its tolerance to impact loading, is evoked by activation of at least five impact energy absorption mechanisms. These are (with respect to FIG. 2):

1. deformation of a matrix comprising the aluminum foil 18a and 18b;
2. filament (16) fracture under tensile loading;
3. matrix/matrix debonding at interface 22 between adjacent plies;
4. filament/matrix debonding (between filaments 16 and matrix material 18a and/or 18b); and
5. filament (16) pullout from ply 20 under tensile loading.

Analytical representation of this energy-absorbing behavior is as follows:

$$\Sigma I = I_{md} + I_{ff} + I_{mm} + I_{fm} + I_{po}$$

wherein, $I$ = impact energy absorption
$md$ = matrix deformation
$ff$ = filament fracture
$mm$ = matrix/matrix debonding
$fm$ = filament/matrix debonding, and
$po$ = pullout The matrix deformation and filament fracture energies may be considered essentially constant for a given set of materials, although a synergistic behavior may occur. By optimizing the remaining parameters, the total impact energy absorption of the article is maximized. One important facet of this absorption is the order in which these energies are released. For example, if filament fragmentation occurs early in the impact cycle, this will limit the energy absorbed due to filament pullout.

Additionally, it has been discovered that as the degree of bonding increases for a given set of materials, the energy absorption potential of the essentially non-constant energy absorption mechanisms ($I_{mm}$, $I_{fm}$ and $I_{po}$) increases until a critical stage is reached. As the bonding is increased still further, the energy absorption mechanisms decrease until a "brittle" fracture occurs. An example of this overall behavior is shown diagrammatically in FIG. 3 wherein total impact energy absorption of a composite article, bonded as previously described, is plotted as a function of shear strength (a measure of degree of bonding). The curve in FIG. 3 represents the locus of points describing the impact energy absorption versus shear strength for any particular set of materials, and it is recognized that a similar family of curves would represent other filament composite material combinations.

Figure 3:
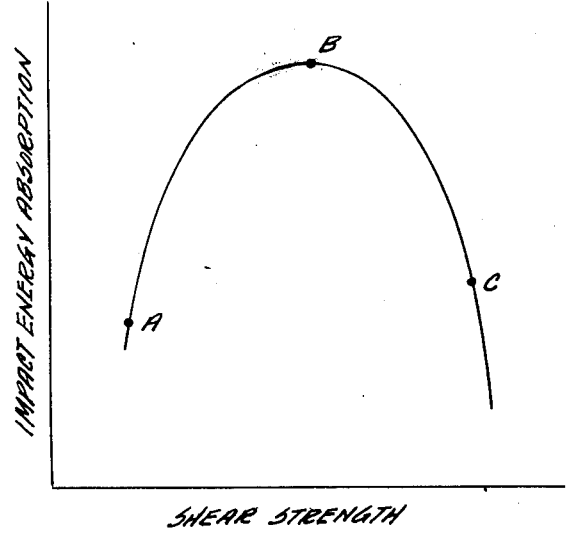
FIG. 3 graphically depicts the impact energy absorption of a composite article as a function of its shear strength.

On the low shear strength side (positive slope) of FIG. 3 (i.e., point A) the filaments and individual laminates are free to move about, much in the manner of a deck of cards, and consequently cannot absorb an extensive amount of energy. As bonding (shear strength) increases, more of the energy absorption mechanisms come into play and the composite article exhibits higher impact strength (point B). Further bonding (actually, over-bonding) reduces the absorption mechanisms of delamination ($I_{mm}$ and $I_{fm}$) and filament pullout ($I_{po}$) and causes the filaments to fracture early in the deformation cycle, thereby absorbing only a limited amount of impact energy and behaving as a brittle material (point C).

Figure 4:
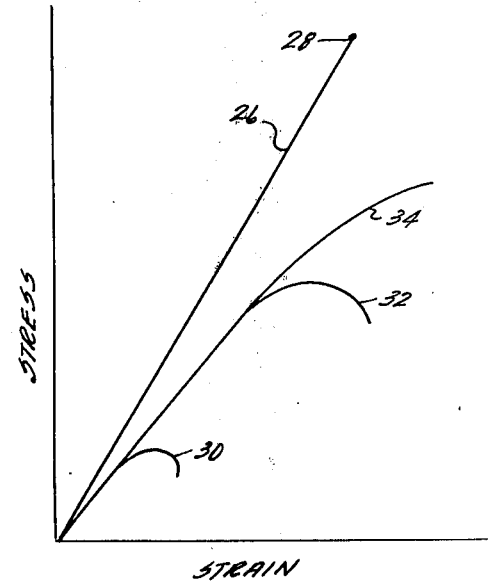
FIG. 4 graphically depicts the shear stress of composite articles as a function of shear strain.

Further illustration of this behavior mechanism appears in FIG. 4 wherein shear stress is plotted as a function of shear strain. Line 26 is indicative of the essentially linear stress-strain relationship for elongated monofilaments 16 (FIG. 2) up to the point of failure (ultimate yield point) 28. Curve 30 depicts a poorly bonded, low shear-strength condition typified by point A, FIG. 3. As stress is applied to such a low bond-strength material, premature delamination precludes the absorption of significant amounts of impact energy. Delamination occurs long before the filament ultimate yield point is reached. In curve 32 of FIG. 4, the matrix is sufficiently bonded such that interlaminate delamination ($I_{mm}$) begins just prior to filament failure and after the initiation of filament/matrix debonding ($I_{fm}$ and $I_{po}$). In this case, representative of point B (FIG. 2), the maximum energy is absorbed since all of the impact energy absorption mechanisms have been brought into play. Thus, this is the strongest article for the given set of materials utilized. Curve 34 illustrates the highly bonded article of point C (FIG. 2) wherein the composite filaments fracture before the onset of delamination ($I_{fm}$ and $I_{po}$) resulting in a brittle composite.

Thus, it clearly becomes advantageous to fabricate an article such as a gas turbine blade with an optimized impact energy absorption potential typified by point B, FIG. 3, and curve 32 of FIG. 4. To that end, the preferred method is to prepare specimens of the bonded filament laminates constructed of the material intended for the article and having varying degrees of shear strength (i.e., varying degrees of bonding). The impact energy absorption/shear strength representation of FIG. 3 can then be obtained through known tests, such as the Charpy impact test. A degree of bonding/shear strength necessary for the desired impact energy absorption can then be selected with confidence for the ultimate article to be fabricated.

In one embodiment of a metallic composite article, particularly a gas turbine engine blade, monotape laminates are laid up and bonded together to form the article. As discussed, each ply or laminate is formed as in FIG. 2 by placing sheets of foil on both sides of the boron layer 16 and bonding them together. In the past, the top and bottom foil sheets (18a, 18b, respectively) have been of the same metal or alloy. However, it has been discovered that different alloy combinations can be incorporated in a single ply to increase the bondability between the layers and to produce unexpected impact resistance characteristics. For example, 1100 Al (essentially unalloyed aluminum) does not bond to 1100 Al as well as 2024 Al (nominally 4 wt. % copper, balance aluminum alloy) bonds to 2024 Al. 1100 Al, an essentially unalloyed aluminum, exhibits high impact strength and for that reason would appear attractive for gas turbine engine applications. However, the high bonding pressures and temperatures needed to prevent premature delamination may produce a brittle blade (or fracture the collimated filaments). An alloy of the 2024 Al type exhibits good fatigue behavior but is less desirable due to its tendency to overbond, as well as its lower ductility. While nominally 4 wt. % copper, balance aluminum alloy (2024 Al) has been chosen by way of example, it is recognized that other aluminum alloys can be utilized, such as 1 – 4 wt. % copper or 2 – 10 wt. % magnesium.

To enhance the bondability, the 1100 Al has been bonded with the 2024 Al alloy. This structure, 1100 Al/2024 Al sandwiched around the collimated boron filaments, exhibits unexpected anisotropic impact properties in that, when impacted from the 2024 Al side, it exhibited impact strengths nearly twice those obtained when impacted from the 1100 Al side and over four times those obtained in an all-2024 Al blade. (It must be remembered that when a blade is impacted on one side, it is the opposite side which is put into the greater tension). Metallographic and scanning electron microscope observations pin-pointed the cause of this behavior to be the ease of debonding of the boron filaments from the 1100 Al. Further, the structure exhibited axial fatigue behavior equivalent to the all-2024 Al composite system. Thus, the degree of bonding of the structure as well as the ductility (plastic behavior) of the matrix materials is determinative of the ultimate impact properties.

Accordingly, a composite blade formed by bonding together a plurality of substantially parallel filament laminates of the type just described would demonstrate the best impact tolerance if the 2024 Al side of each laminate were oriented toward the pressure side of the blade and the 1100 Al side of each laminate were oriented toward the suction side of the blade since it is the pressure side of each blade which is the most susceptible to foreign object impact.

In one embodiment, just the tip section of a blade is fabricated in accordance with the present invention. In a gas turbine engine, for example, it is the blade tip that is most susceptible to impact damage and, thus, incorporation of a material with high impact resistance in the tip can greatly enhance blade survivability. Conversely, the root and dovetail of the blade should demonstrate high fatigue strength characteristics, particularly where the blade is of the cantilevered type as shown in FIG. 1, but can still tolerate a lower impact resistance.

Accordingly, a blade is fabricated of a plurality of substantially parallel, bonded filament laminates 36 shown in an exploded view of FIG. 5. As discussed previously, each laminate comprises a plurality of continuous collimated filaments 38 embedded in a matrix (only the filaments of one laminate being shown for clarity). In accordance with the present embodiment, the roots 40 of the laminates are formed with a matrix material having a relatively high fatigue strength characteristic compared to the tip portion 42, whereas the tip matrix material is more impact tolerant.

Consider a laminate as shown in FIG. 2 wherein foil layers 18a and 18b originally comprise the same material, such as an aluminum alloy (for example, 2024 Al). To improve the impact characteristic of a blade formed of such laminates, it is suggested that the foil at the tip, on one side of the collimated filaments, be peeled back (delaminated) and removed down to a spanwise location indicated at 44 without damaging the filaments 38. In its place, a foil of a more impact resistant material (such as 1100 Al) is rebonded to the filaments and the remaining foil matrix material. When this material substitution takes place on the blade suction surface side of each laminate, the resulting impact tolerance of the blade tip will be improved significantly (up to four times higher where 1100 Al is substituted for 2024 Al) as previously discussed.

Preferably, the transition region 44 between the designated root and tip sections is between 40 and 95% span from the blade tip and may be chevron-shaped as in FIG. 5, diagonally slashed, or the like. It is also preferred that the transition zone be staggered as between adjacent elements to avoid locally weak zones. Notice that in FIG. 5 the chevrons have been reversed in alternating plies and the location thereof has been gradually shifted radially through the blade in order to minimize any inherent weakness associated with such a transition. Superimposed, the laminates appear as in FIG. 6. Since the filaments remain continuous in any one ply, and since the "replacement" matrix material has been selected from a group which exhibits favorable bondability with respect to the "original" matrix material, the resulting blade will, after consolidation and bonding of the laminates, reveal little if any indication of the transition at the matrix interface 44.

In a like manner, any blade could be individually tailored and strengthened to meet anticipated environmental requirements. For example, the two-material matrix just described could comprise the root portion of a blade with the tip comprised entirely of a high impact-resistant matrix (for example, 1100 Al). Or, the root could comprise entirely the high fatigue matrix material (such as 2024 Al) and the tip comprise an all-1100 Al matrix. The combinations are numerous where materials and alloys are varied.

It will be obvious to one skilled in the art that certain changes can be made to the above-described invention without departing from the broad inventive concepts thereof. For example, the concept of multiple alloy plies would be applicable to matrix materials other than aluminum, wherein one side exhibited higher impact strength, and the other side better fatigue/bondability properties. The same approach would also be applicable to resin matrix composites. It is intended that the appended claims cover these and all other variations in the present invention's broader inventive concepts.

Having thus described the invention, what is considered novel and desired to be secured by Letters Patent of the U.S. is:

1. A blade for use in a fluid flow machine, said blade having a tip portion and a root portion fabricated of a plurality of bonded filament laminates, said laminates characterized by a plurality of continuous collimated filaments embedded in a first matrix at the blade root and a second matrix at the blade tip, said first and second matrices being bonded together at a common interface, said second matrix comprising two materials sandwiching said filaments and characterized by a greater impact strength than said first matrix and wherein the first of said materials is characterized by a greater bondability to itself and to said filaments relative to said second material.

2. The blade as recited in claim 1 wherein said matrices are metallic.

3. The blade as recited in claim 2 wherein said matrices are materials selected from the group consisting of aluminum and aluminum alloys, and said filaments comprise substantially boron.

4. The blade as recited in claim 2 wherein said second matrix comprises two metallic foil sheets sandwiching said filaments, and wherein one of the sheets of the second matrix is of the same material as said first matrix.

5. The blade as recited in claim 1 wherein the interfaces of adjacent laminates do not substantially overlap.

6. A blade having a suction surface, a pressure surface, a tip and a root, and fabricated of a plurality of bonded filament laminates, at least one of said laminates comprising a plurality of continuous collimated filaments sandwiched and bonded between two materials at the tip, the first of said materials characterized by greater bondability to itself and to said filaments relative to the second of said materials and disposed toward the blade pressure surface, and wherein said filaments are sandwiched and bonded between two layers of said second material at the blade root.

7. A blade having a suction surface, a pressure surface, a tip and a root and fabricated of a plurality of bonded filament laminates, at least one of said laminates comprising a plurality of continuous collimated filaments sandwiched and bonded between two materials at the root, the first of said materials characterized by greater bondability to itself and to said filaments relative to the second of said materials and disposed toward the blade pressure surface and wherein said filaments are sandwiched and bonded between two layers of said first material at the blade tip.

* * * * *